Jan. 13, 1959  A. J. KINDIG  2,868,567
GREASE SEAL

Filed April 18, 1955  2 Sheets-Sheet 1

INVENTOR;
ARNIE J. KINDIG,
BY
ATTY.

Jan. 13, 1959     A. J. KINDIG     2,868,567
GREASE SEAL

Filed April 18, 1955     2 Sheets-Sheet 2

INVENTOR;
ARNIE J. KINDIG,
BY
ATT'Y.

United States Patent Office 2,868,567
Patented Jan. 13, 1959

2,868,567

GREASE SEAL

Arnie J. Kindig, Columbus, Ohio, assignor to The Jeffrey Manufacturing Company, a corporation of Ohio Application April 18, 1955, Serial No. 501,830

9 Claims. (Cl. 286—11)

This invention relates to a grease seal, and an object of the invention is to provide an improved grease seal for a bearing, such as an anti-friction bearing, which is very efficient and which will prevent loss of grease as well as prevent entry of foreign matter into the bearing.

Another object of the invention is to provide a grease seal of the character described, in which there is an inner seal assembly cooperating with an outer seal assembly, and which are constructed to facilitate assembling and adjustment of parts, compensate for wear and provide a low starting torque for the rotatably mounted parts of the bearing.

Other objects of the invention will appear hereinafter, the novel features and combinations being set forth in the appended claims.

This application is a continuation-in-part of my copending patent application Serial No. 280,277, filed April 3, 1952, now abandoned.

Figure 1:
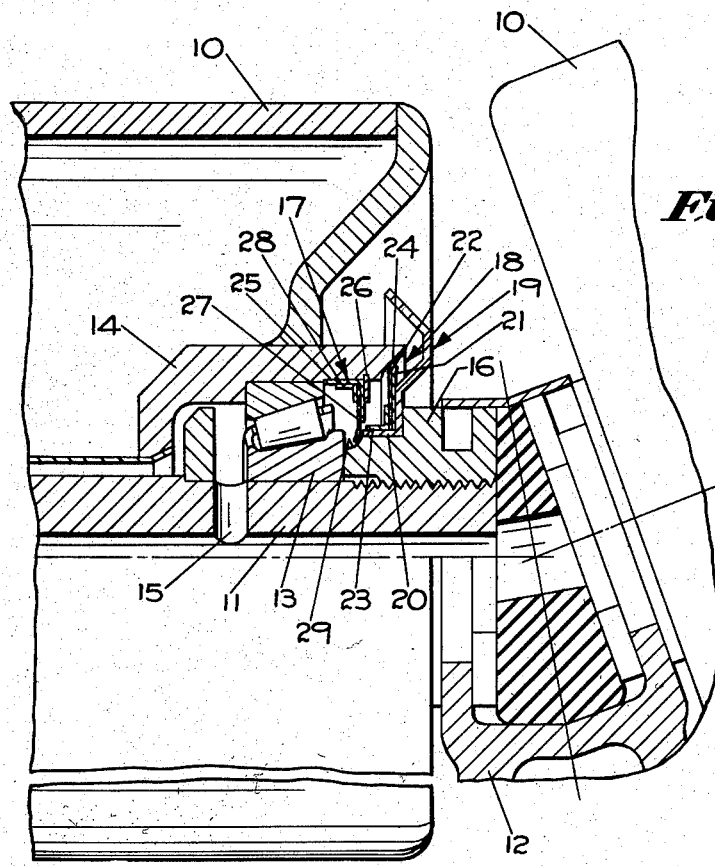
Fig. 1 is a combination elevational and sectional view showing a belt idler incorporating features of my invention.

Referring particularly to Fig. 1 of the drawings there is shown an idler roll 10 mounted for rotation on a fixed shaft 11 mounted in spaced standards or brackets, one of which is seen at 12. An anti-friction roller bearing 13 is provided in a cup 14 adjacent each end of the roll 10 and thus supports the roll 10 for anti-friction rotation on the shaft 11. The cup 14 provides a grease chamber for the bearing 13, the grease being fed thereto by means of the shaft 11 which is preferably hollow and is provided with a grease feeding bore 15. The outer race of the bearing 13 preferably has a press fit with the cup 14, and the inner race is adjustable on the shaft 11 by means of a nut 16 threaded on said shaft 11, which nut 16 is received in the standard or bracket 12.

A pair of grease seals 17 and 18 are provided between the outer end of the cup 14 and the nut 16 and they cooperate with said cup 14 and nut 16 so as to prevent loss of grease from the grease chamber provided by the cup 14 and also prevent any entrance of external foreign material into said grease chamber. The bearing 13 is thereby assured of adequate clean grease at all times.

Figure 2:
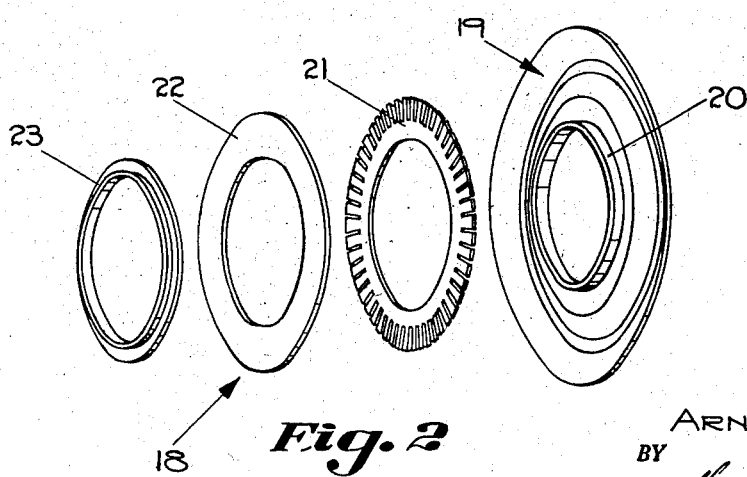
Fig. 2 is an exploded view of one of the seals and associated shield of Fig. 1.

Attention is now directed particularly to Figs. 1 and 2 and to the construction of the grease seal 18 and associated protecting shield. A protecting shield 19 has a cylindrical base 20 which has a press fit on a cylindrical receiving portion of the nut 16. As clearly suggested in Fig. 2 of the drawings a seal spring in the form of a serrated spring disc 21 is first slipped on the base 20 of the shield 19, after which seal disc 22 is placed thereon which is held thereon by means of a seal retaining ring 23 which preferably has a tight or press fit on the cylindrical base 20 of the shield 19. The outer edge or periphery of the seal disc 22 has feather wiping contact with a wiping surface 24 which is preferably concave and which is formed adjacent the outer edge of the cup 14. Of particular significance is the fact that the wiping surface 24 with which the outer edge of the seal 22 has contact makes an acute angle with the axis of rotation of the bearing 13 and the roll 10 which, of course, is about the axis of the shaft 11. In other words, it is important that the wiping surface 24 be other than a cylinder the axis of which is parallel with the axis of the bearing 13 or the axis of which is vertically at right angles thereto.

It is furthermore important that the area of contact between the disc 22 and the surface 24 be on the inside of said disc 22 rather than on the outside thereof, as compared with its position relative to the bearing 13. The reason for this is that any pressure exerted from the outside on the seal 22 will thereby tend to force said seal against the surface 24, thereby increasing its sealing effect and thus preventing any entrance of outside foreign material into the bearing cup 14, thereby preventing foreign material from reaching the bearing 13.

It is evident that the seal 18 does not rotate but is removably attached to the nut 16, with the inner surface of its outer edge in wiping contact with the rotating cup 14. The seal 17 is generally similar to the seal 18. However, seal 17 is attached to and rotates with the cup 14 and it includes a retaining ring 25 which is angular in cross-section and which has a reasonably close fit with the adjacent cylindrical surface of the retaining ring 23, being held in place by a snap ring 26 which snaps in a groove in said cup 14. It also includes a seal disc 27 which is essentially the same as the seal disc 22. It further includes a seal retaining ring 28 which is essentially similar to the retaining ring 23.

The outer surface of the inner edge of the disc 27 has wiping sealing contact with a concave surface 29 formed on the nut 16. This wiping surface 29 preferably makes an acute angle with the axis of rotation of the bearing 13 for reasons similar to those above described in connection with the surface 24. By virtue of the fact that the outer surface of the inner edge of the disc 27 contacts the wiping surface 29, it is obvious that any pressure within the cup 14 which is exerted on the seal disc 27, tending to move it outwardly, which may, for example, be caused by grease being delivered to cup 14 under pressure, or other reasons, will tend to increase the sealing effect of said disc 27, thus effectively precluding the loss of any grease therethrough. A "blow out" of seal 17 is prevented since snap ring 26 holds it in place and clearance between the inner edge of the radially extending portion of ring 25 and the adjacent retainer ring 23 is of the order of .030 inch, which clearance is sealed completely by pressure on seal disc 27.

In addition to the physical arrangement of the two seals 17 and 18 and associated parts, the composition of the seal discs 22 and 27 are of considerable importance. Each of said seal discs 22 and 27 is preferably made of the same material, some of the characteristics being particularly important for the inner seal disc 27, others being equally important for both of them. Said discs 22 and 27 are preferably made by coating airplane cloth with synthetic rubber on both sides. It is also preferable that the thickness of this disc be of the order of .025–.030 inch. Such a seal disc is impervious to water, grease, gasoline, and the like, is resistant to deterioration by oils and greases and this is particularly important because the bearing 13 is, of course, normally supplied with grease. Such a disc is quite flexible both because of the material of which it is made and because of its thickness, and this flexibility is relatively free from fatigue and is maintained over a very wide range of temperatures. This is important because seals are subject to considerable temperature variations particularly on outside installations. Furthermore, this seal material is relatively free from permanent set and drift. Furthermore, the life of this material at both high temperatures and low temperatures and at changing temperatures is very great. In addition it does not age fast. Furthermore, it does not deteriorate either under fresh or salt water, and neither acids nor alkaline solutions attack it.

One such material is sold under the trademark "Fairprene" which is manufactured and sold by the Du Pont Company, the particular quality preferably employed being that designated by the number 5094–A. Obviously, equivalent material of other manufacturers, having the characteristics above named, may be used with equal facility.

Figure 3:
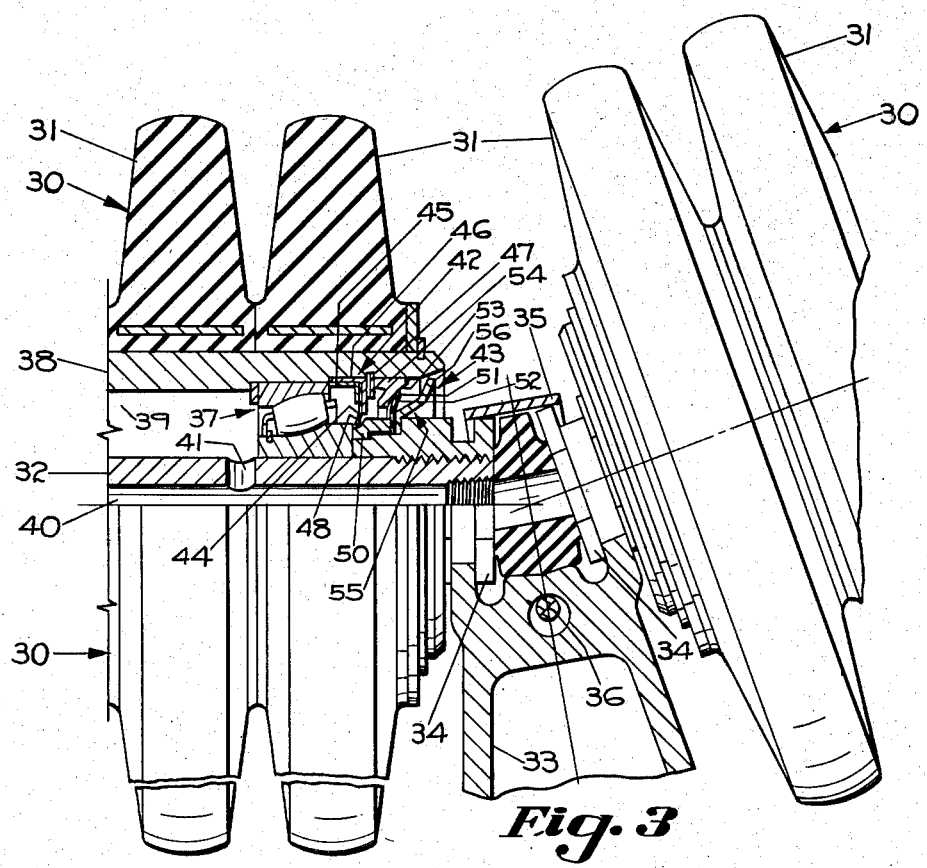
Fig. 3 is a view similar to Fig. 1 showing a roller for a conveyor incorporating modified features of my invention.

In Fig. 3 I have illustrated a modified form of my grease seal in connection with an impact idler or roller 30 for a conveyer. A portion of a conveyer roll assembly is shown in Fig. 3 in which rubber wheels 31 of the idler are mounted for rotation on a fixed shaft 32, the ends of which are carried in spaced standards or brackets, one of which is indicated at 33. An adjustment nut 34 threaded to the end of shaft 32 has its outer end received and carried in the standard 33. A C-clamp 35 fastened with a cotter pin 36 provides for connecting nut 34 to the standard 33.

An anti-friction roller bearing, indicated generally at 37, mounted in a sleeve or tube 38 adjacent each end of the roller 30 supports the wheels 31 for rotation on the shaft 32. Tube 38 forms a grease chamber 39 for the bearing 37. Grease is fed to the grease chamber and bearing under pressure from the outer end of shaft 32 through a central bore 40 in the shaft to the passage 41 which connects with the grease chamber. The outer race of the bearing 37 has a press fit with the tube 38 and the inner race is adjustable on shaft 32 by means of nut 34.

A grease seal comprising an inner seal assembly, indicated generally at 42 in Fig. 3, and an outer seal assembly, indicated generally at 43, is mounted in position on one side of the bearing 37 to provide for sealing grease within the grease chamber as it moves out of passage 41 into the grease chamber and past the bearing. This grease seal also provides for sealing the grease chamber so that foreign material, such as abrasive particles, for example, from external sources can not enter the grease chamber from the open end of tube 38 in a direction from the right end, as seen in Fig. 3. The bearings 37 are thus assured of an adequate supply of clean grease at all times.

Figures 4, 5:
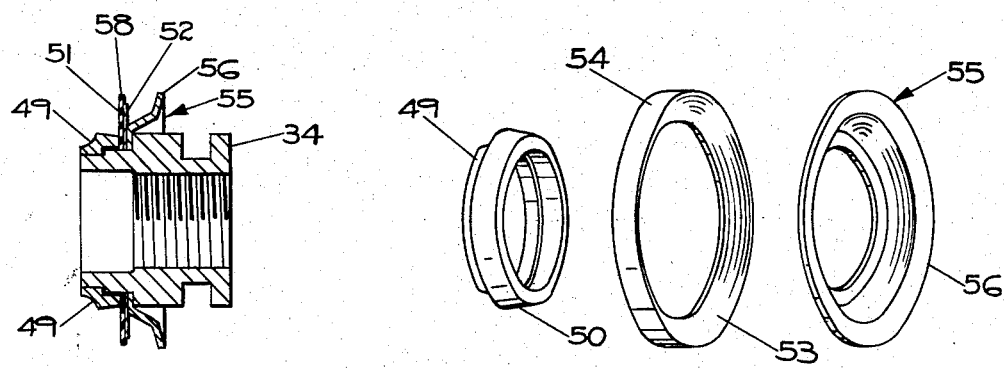
Fig. 4 is an enlarged vertical sectional view of the outer seal assembly shown in Fig. 3.
Fig. 5 is an exploded view of the outer seal assembly shield, seal and retainer members shown in Fig. 3.
Figure 6:
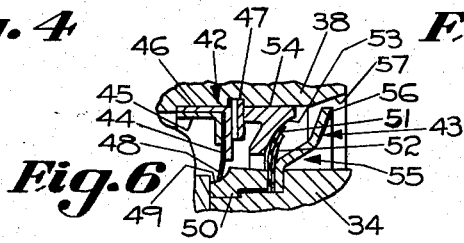
Fig. 6 is an enlarged vertical sectional view showing the inner and outer seal assemblies of Fig. 3.

The inner seal assembly 42, as seen most clearly in Fig. 3, is carried by and rotates with the tube 38 and includes a disc or diaphragm 44 similar in composition and construction to the seal disc 27 described in connection with Fig. 1. Disc 44 is held in position between a retaining ring 45, Fig. 6, which seats against the outer race of bearing 37 and a retaining ring 46, which has a press fit with tube 38. The seal assembly 42 is retained in position by a snap ring 47 mounted in a groove cut in tube 38. The disc 44 is formed of resilient material, identical with that used for disc 27, so that the outer edge thereof may be flexed or bent slightly as indicated at 48, when in contact with a concave wiping surface 49 formed on the outer seal assembly retainer 50, Figs. 5 and 6.

Wiping surface 49 may be die cast or machined, as preferred, and in general is similar in construction and operation to wiping surface 29 as described in connection with Fig. 1. In general, surface 49 is formed to provide a smooth concave surface which is neither parallel to nor at right angles vertically to the axis of rotation of the bearing 37 and tube 38, with reference to Fig. 3, in any area contacted by the edge 48 of disc 44. This surface may be further defined as the arc of a circle subtended by radii which make an acute angle in relation to a horizontal plane extending parallel to the axis of rotation of bearing 37 and tube 38 and to a plane extending vertically at right angles to said horizontal plane. In operation, the inner seal assembly is adjusted so that the projecting edge 48 of disc 44 has a feather touch or contact only sufficient to flex the edge slightly when it seats or engages surface 49. The seal thus effected provides several advantages, one of which is that the feather touch or contact is easily made without requiring extreme accuracy of adjustment and of parts. This seal construction also provides a minimum of rubbing contact, which reduces the amount of torque required to start rotation of the parts, and maintains sealing contact with surface 49 as the parts wear. Furthermore, when grease under pressure moves past the bearing 37 in a direction to leave the grease chamber 39, i. e., toward the right end of tube 38 having reference to Fig. 3, the pressure thus produced on disc 44 increases the sealing action of the disc by causing a greater portion of the disc edge 48 to seat on the surface 49. This action retains the grease within chamber 39 and insures that the bearing 37 is properly lubricated at all times.

The outer seal assembly 43 is carried on the nut 34 and includes a resilient disc or diaphragm 51, which is similar in composition and construction to the seal disc 22 described in connection with Fig. 1. A spring 52 in the form of a serrated disc, similar in construction and operation to the seal spring 21 of Fig. 1 is provided, as shown most clearly in Fig. 6, to insure that disc 51 makes contact with a surface 53 formed on seat member 54. Disc 51 and its spring 52 are retained in position by ring 50, which is mounted on the nut 34 with a press fit, Figs. 3 and 5, and by a shield 55 which is also mounted on the nut 34 with a press fit. Shield 55, Figs. 5 and 6, when mounted in position extends or projects across the open end of tube 38 to provide for substantially closing that entrance to the grease chamber. It will be noted that the outer edge 56 of the shield is bent outwardly and away from the disc 51 and projects upwardly to within a reasonably close clearance with a beveled inner surface 57 of tube 38. This shield thus provides for effectively closing the entrance to the grease chamber.

When assembled, seat member 54 seats against the snap ring 47 and has a press fit with the interior of tube 38. The concave wiping surface 53 of the seat 54 is formed and constructed in the same manner as the previously described surface 49, and in operation serves the same purpose and function as previously described in connection with surface 49. Thus, in operation the outer seal assembly is adjusted so that the projecting edge 58, Fig. 4, also has a feather touch or contact only sufficient to flex the edge slightly against the pressure of spring 52 when the disc edge 58 makes contact or seats with the surface 53. Thus if any foreign material enters between the upper or outer edge 56 of the shield 53 and the beveled surface 57 of tube 38 it tends to increase the pressure exerted against disc 51 and increases its sealing action by causing a greater portion of the disc edge 58 to seat on the concave surface 53.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. A rotatable assembly comprising a shaft, an annular member concentric with the shaft, bearing means supporting the annular member on the shaft for relative rotation of the annular member and the shaft, means for securing the bearing means in position, means for sealing one side of the bearing means to prevent the escape of lubricant from the bearing means and to prevent the entrance of dust to the bearing means, said sealing means comprising a first seal element on the annular member and abutting the securing means, a second seal element on the securing means and abutting the annular member, said seal elements being flexible, the first seal element being flexed by the securing means towards the bearing means and the second seal element being flexed by the annular member away from the bearing means, said annular member and the securing means respectively including means for flexing the seal elements as the securing means is assembled with the bearing means, the first seal element forming a lubricant seal and the second seal element forming a dust seal.

2. A rotatable assembly comprising a shaft, an annular member concentric with the shaft, bearing means supporting the annular member on the shaft for relative rotation of the annular member and the shaft, means for securing the bearing means in position, means for sealing one side of the bearing means to prevent the escape of lubricant from the bearing means and to prevent the entrance of dust to the bearing means, said sealing means comprising a first seal element on the annular member and abutting the securing means, a second seal element on the securing means and abutting the annular member, said seal elements being flexible, the first seal element being flexed by the securing means towards the bearing means and the second seal element being flexed by the annular member away from the bearing means, said securing means including means for flexing the first seal element as the securing means is assembled with the bearing means, the first seal element forming a lubricant seal and the second seal element forming a dust seal.

3. A rotatable assembly comprising a shaft, an annular member concentric with the shaft, bearing means supporting the annular member on the shaft for relative rotation of the annular member and the shaft, means for securing the bearing means in position, means for sealing one side of the bearing means to prevent the escape of lubricant from the bearing means and to prevent the entrance of dust to the bearing means, said sealing means comprising a first seal element on the annular member and abutting the securing means, a second seal element on the securing means and abutting the annular member, said seal elements being flexible, the first seal element being flexed by the securing means towards the bearing means and the second seal element being flexed by the annular member away from the bearing means, said annular member including means for flexing the second seal element as the securing means is assembled with the bearing means, the first seal element forming a lubricant seal and the second seal element forming a dust seal.

4. A rotatable assembly comprising a shaft, an annular member concentric with the shaft, bearing means supporting the annular member on the shaft for relative rotation of the annular member and the shaft, means on the shaft cooperating with the annular member to form a seal at one side of the bearing means to prevent the escape of lubricant from the bearing means and to prevent the entrance of dust to the bearing means, a first seal element on the annular member and abutting the cooperating means, a second seal element on the cooperating means and abutting the annular member, said seal elements being flexible, the first seal element being flexed by the cooperating means towards the bearing means and the second seal element being flexed by the annular member away from the bearing means, said annular member and the cooperating means respectively including means for flexing the seal element as the cooperating means is assembled on the shaft, the first seal element forming a lubricant seal and the second seal element forming a dust seal.

5. A rotatable assembly including a shaft, an annular member radially spaced from the shaft having a seat for a bearing means disposed between the shaft and the annular member and supporting the annular member on the shaft for relative rotation of the annular member and the shaft, means fixed to the shaft for retaining the bearing means in the seat, a peripheral surface of the retaining means adjacent the bearing means curved inwardly towards the bearing means, a flexible seal element extending inwardly from the annular member towards the retaining means and abutting the curved surface thereof flexing the seal element towards the bearing means, a surface on the annular member curved outwardly away from the bearing means, a flexible seal element projecting outwardly from the retaining means towards the annular member and abutting the curved surface thereof flexing the seal element away from the bearing means, the first said seal element retaining the lubricant in the bearing means and the second said seal element preventing dust from entering the bearing means.

6. A seal comprising a first member, a second member cooperating with the first member to form the seal, the first member and the second member being disposed in overlapping spaced relation, a first flexible sealing element on the first member abutting the second member and being flexed thereby into sealing engagement with the second member, a second flexible sealing element on the second member abutting the first member and being flexed thereby into sealing engagement with the first member, and oppositely directed means on the first member and on the second member respectively for flexing the sealing elements in opposite directions as the first and second members are assembled in overlapping spaced relation.

7. A seal comprising a first member, a second member cooperating with the first member to form the seal, the first member and the second member being disposed in overlapping spaced relation, the first member and the second member each including an inclined sealing surface, a first flexible sealing element on the first member abutting the sealing surface on the second member and being flexed thereby to lay in sealing engagement with the second member, a second flexible sealing element on the second member abutting the sealing surface on the first member and being flexed thereby to lay in sealing engagement with the first member, the sealing surfaces on the first member and on the second member facing in opposite directions for flexing the sealing elements as the first and second members are assembled in overlapping spaced relation.

8. A rotatable assembly comprising a shaft, an annular member concentric with the shaft, bearing means supporting the annular member on the shaft for relative rotation of the annular member and the shaft, a seal for one side of the bearing means to prevent the escape of lubricant from the bearing means and to prevent the entrance of dust to the bearing means comprising, a first flexible sealing element on the annular member extending inwardly towards the shaft, means on the shaft engaging the first sealing element and flexing said element towards the bearing means to form a lubricant seal, a second flexible sealing element on the shaft extending outwardly towards the annular member, means on the annular member engaging the second sealing element and flexing said element away from the bearing means to form a dust seal.

9. A rotatable assembly comprising a shaft, an annular member concentric with the shaft, bearing means supporting the annular member on the shaft for relative rotation of the annular member and the shaft, a seal for one side of the bearing means to prevent the escape of lubricant from the bearing means and to prevent the entrance of dust to the bearing means comprising, a first flexible sealing element on the annular member extending inwardly towards the shaft, a surface on the shaft inclined downwardly towards the bearing means, said surface on the shaft engaging the first sealing element and flexing said element towards the bearing means to form a lubricant seal, a second flexible sealing element on the shaft extending outwardly towards the annular member, a surface on the annular member inclined upwardly away from the bearing means, said surface on the annular member engaging the second sealing element and flexing said element away from the bearing means to form a dust seal.

References Cited in the file of this patent

UNITED STATES PATENTS

| | | |
|---|---|---|
| 1,387,087 | White et al. | Aug. 9, 1921 |
| 1,982,729 | Eberhard | Dec. 4, 1934 |
| 2,245,475 | Hately | June 10, 1941 |
| 2,248,761 | Kosatka | July 8, 1941 |
| 2,479,968 | Schick | Aug. 23, 1949 |
| 2,636,755 | Saywell | Apr. 28, 1953 |
| 2,702,868 | Kindig | Feb. 22, 1955 |
| 2,705,654 | Saywell | Apr. 5, 1955 |